Nov. 3, 1936.  H. W. RUPPLE  2,059,711
AUTOMATIC METALWORKING MACHINE
Filed Oct. 6, 1934   4 Sheets-Sheet 1
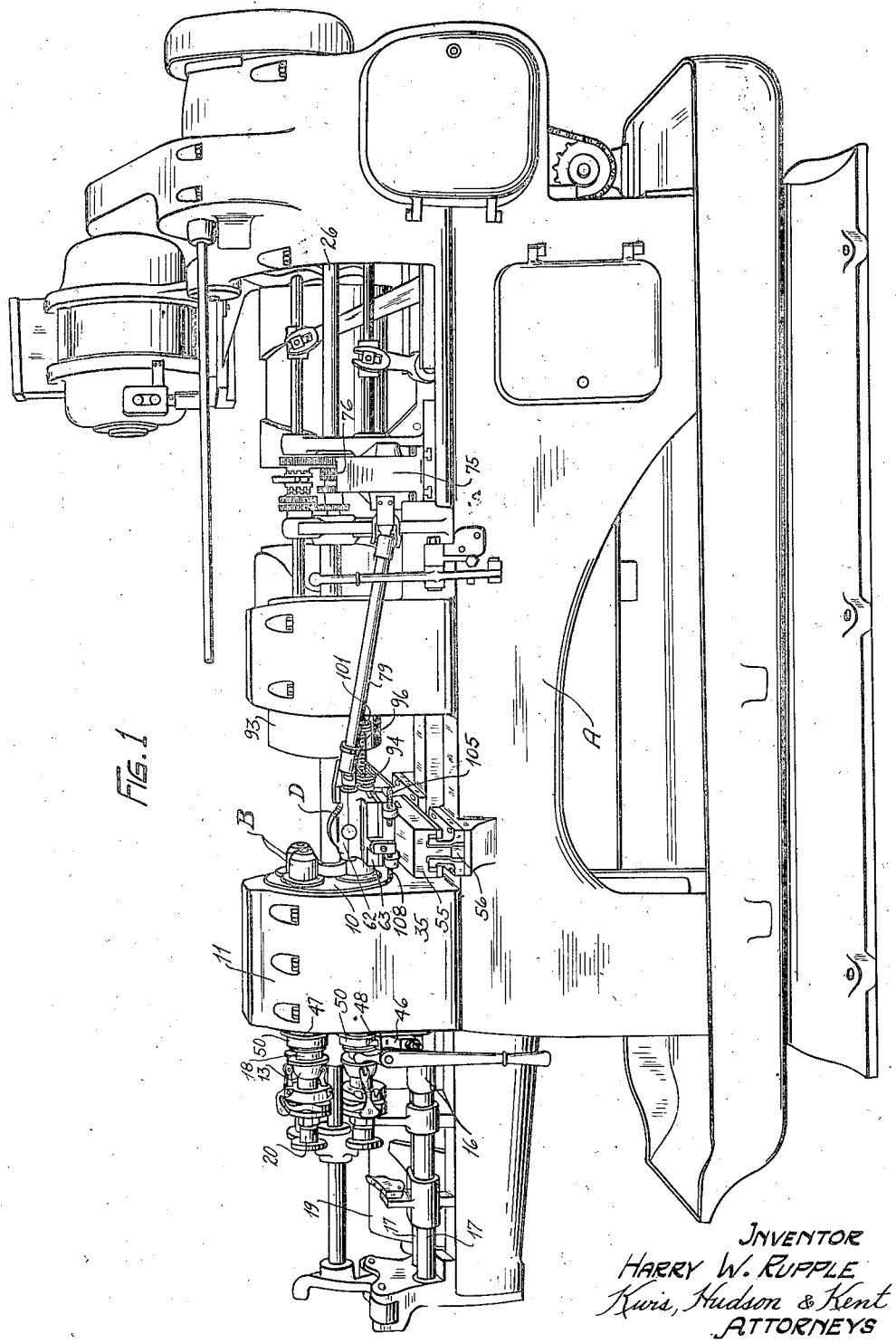
INVENTOR
HARRY W. RUPPLE
Kwis, Hudson & Kent
ATTORNEYS

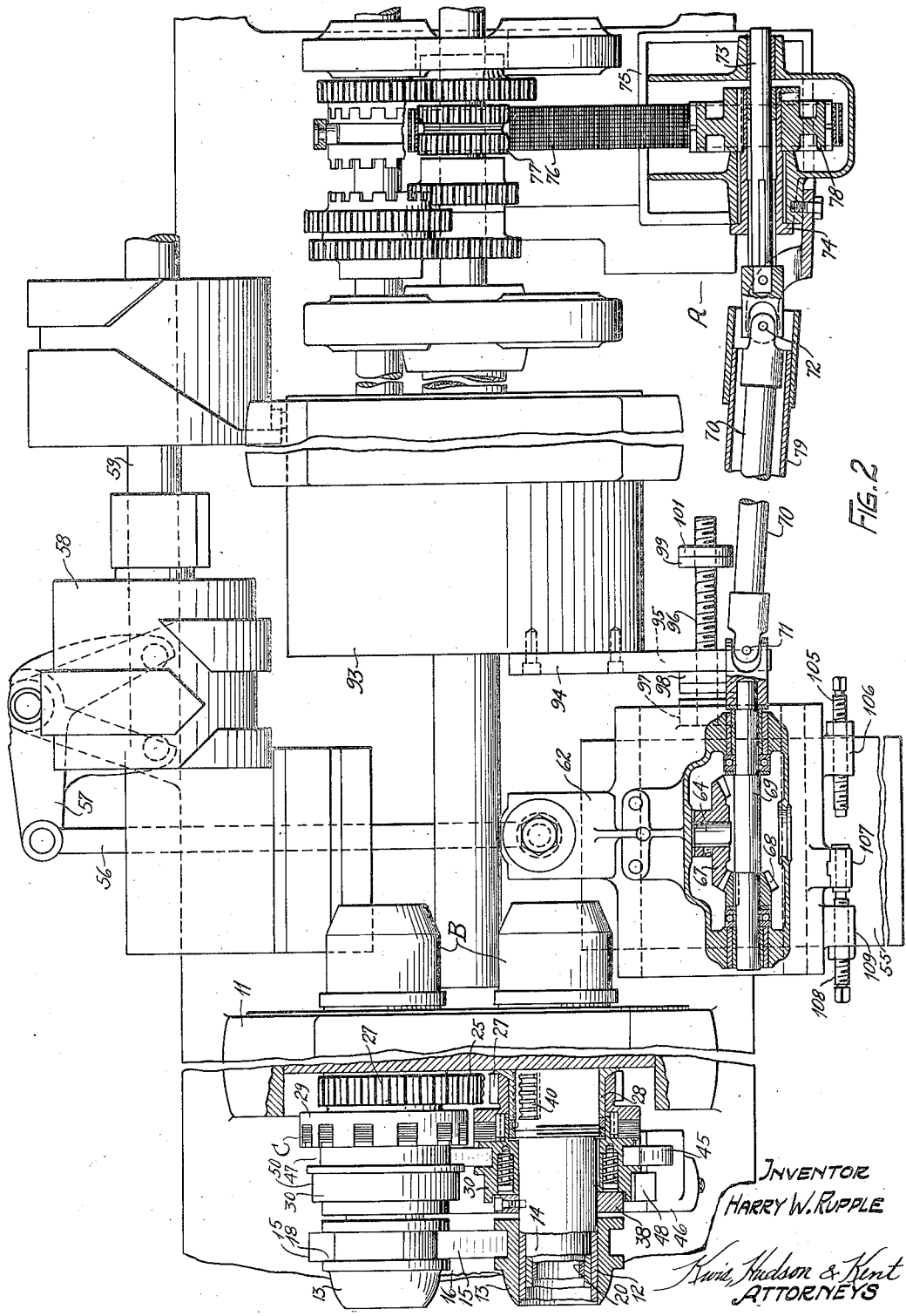

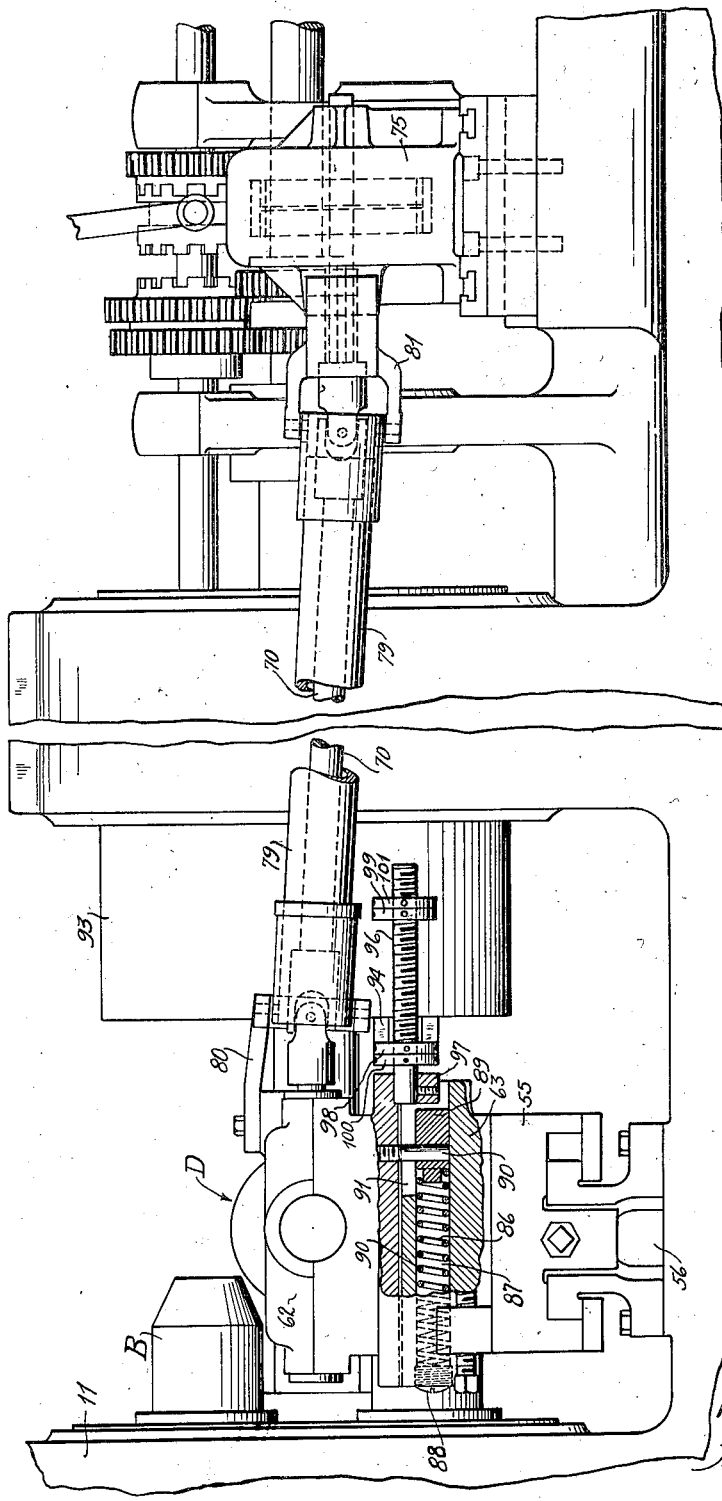

Nov. 3, 1936.    H. W. RUPPLE    2,059,711
AUTOMATIC METALWORKING MACHINE
Filed Oct. 6, 1934    4 Sheets-Sheet 4

INVENTOR
HARRY W. RUPPLE
Kwis, Hudson & Kent
ATTORNEYS

Patented Nov. 3, 1936

2,059,711

UNITED STATES PATENT OFFICE 2,059,711

AUTOMATIC METALWORKING MACHINE

Harry W. Rupple, Shaker Heights, Ohio, assignor to The Cleveland Automatic Machine Company, Cleveland, Ohio, a corporation of Ohio Application October 6, 1934, Serial No. 747,128

9 Claims. (Cl. 29—37)

The present invention relates to automatic metal working machine tools, and more particularly to slotting mechanism for single spindle or multiple spindle indexable turret bar or chucking machines.

Machines of the general character referred to comprise one or a plurality of work spindles provided with work holding chucks at the front ends thereof rotatably supported in suitable apertures in the machine frame or, in the case of an indexable turret type of machine, in an indexable turret. In the case of "bar" machines, the work usually comprises a bar or rod of stock supported in the spindle and periodically advanced therethrough, whereas in the "chucking" machines rough blanks of predetermined shape are periodically fed to or inserted in the work holding chucks from the front of the spindle. In the indexable spindle turret type of machine, the turret is periodically indexed to carry the spindles successively through a plurality of stations, one of which is the feeding or chucking station, at which station the stock bar is advanced through the spindles or a new blank inserted therein, depending upon the type of machine. At the other stations, usually referred to as the tool stations, predetermined operations are performed upon the work supported in the spindle chucks, by one or a plurality of tools carried by a plurality of tool slides commonly referred to as "main", "cross", and/or "head", depending upon the particular construction of the machine and the operation to be performed upon the work. The foregoing is a brief outline of the types of machines to which the present invention relates, and many embodiments of the structure referred to above will be found in the prior art.

An object of the present invention is the provision of a novel automatic metal working machine comprising a rotatable spindle wherein the rotation of the spindle is interrupted at predetermined intervals and a slotting operation performed on a work piece supported therein.

Another object of the invention is the provision of a novel multiple spindle indexable turret either bar or chucking type automatic metal working machine tool comprising a plurality of rotatable spindles, and means for interrupting the rotation of the spindles at one of the stations and performing a slotting operation upon a work piece supported therein.

Another object of the invention is the provision of a slotting attachment for an automatic metal working machine tool of either the single or multiple spindle indexable turret type of bar or chucking machine adapted to perform a slotting operation on stock or work blanks supported in one of the spindles during an interval of time when the rotation of the spindle is interrupted.

Another object of the invention is the provision of a novel spindle for a metal working machine, comprising a clutch for connecting and disconnecting the spindle with and from a driving means.

A further object of the invention is the provision of a novel metal working machine comprising a rotatable spindle and means for connecting and disconnecting the spindle with and from the driving means therefor.

The invention resides in certain novel features and details of construction, and combinations and arrangements of parts, and further objects and advantages thereof will be apparent to those skilled in the art to which it pertains from the following description of the preferred embodiment thereof, described with reference to the accompanying drawings, in which Fig. 1 is a front elevation of a multiple spindle indexible turret type of bar machine embodying the present invention;

Fig. 2 is a plan, with portions shown in horizontal section;

Fig. 3 is an enlarged front elevation of the slotting mechanism, with portions shown in vertical section;

Figure 7:
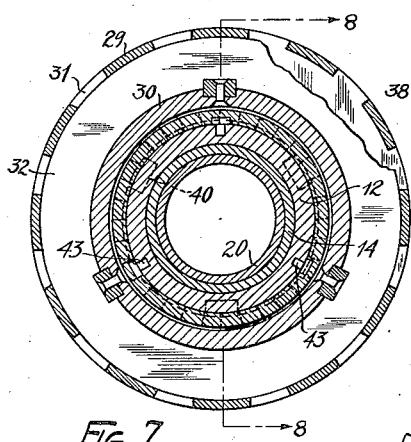
Fig. 7 is a section on the line 7—7 of Figs. 2 and 8.

The present invention contemplates the provision of a machine of the character referred to which will cut either a transverse or a longitudinal slot, such as the keyway in a stock bar or work blank supported in the spindle chuck. The invention is particularly applicable to multiple spindle indexable turret type bar or chucking machines and is illustrated and described herein as embodied in a "Cleveland Automatic" four spindle indexable turret type of bar or rod machine. Only those parts of the machine which are necessary to a clear understanding of the invention are illustrated and described. The remainder of the machine is old and well known in the art and may be found embodied in a plurality of different structures.

According to the provisions of the present invention, the work spindle is periodically disconnected from its driving means and held in fixed position while the slotting operation is performed on the stock bar or work blank supported therein. In the case of multiple spindle indexable turret type of machines, the slotting operation is performed on the work in one or more of the stations as the spindles are successively indexed therethrough. In the machine illustrated, the slotting mechanism proper is supported on the front cross-slide of the machine and the slotting operation takes place in the lower front station, but it will be apparent that the slotting mechanism may be positioned at any of the other stations, as desired.

Referring to the drawings, in which similar reference characters designate corresponding parts throughout the several views thereof, a plurality of work spindles, designated in general by the reference character B, in the present instance four, are rotatably supported in suitable longitudinal apertures in the work spindle turret 10 rotatably supported in the spindle head 11 of the frame of the machine which is designated in general by the reference character A. The spindles B are equally spaced about the axis of rotation of the turret, are identical in construction, and comprise a spindle tube 12 rotatably supported by suitable bearings provided with means for taking up wear, etc. While the feed tubes illustrated in U. S. Patent No. 1,950,931 are not provided with the preferred type of feed collets, the spindles B operate in a similar manner and may be considered similar in construction, for the purpose of illustrating the present invention, with the exception that a friction clutch C, hereinafter referred to, has been interposed between the driven gear carried by the spindle and the spindle tube which has been lengthened to accommodate the aforesaid clutch.

The chuck thimbles 13, of conventional construction, are actuated in predetermined timed relation to the other operations of the machine to open and close the chuck collets through the medium of chuck tubes 14 by the engagement of a brass shoe 15, carried by a member 16 slidably supported on parallel rods 17 fixed in the frame A in an annular groove 18 therein at the feeding station. The member 15 is actuated by and is under control of a cam drum 19 carried by an auxiliary cam shaft rotatably supported by the frame A and driven in a manner well known in the art. Feed tubes 20 slidably supported in the spindle tubes 12 are actuated in predetermined timed relation to the actuation of the chucks and the other operations of the machine to periodically advance the stock bars through the spindles by mechanism well known in the art and which forms no part of the present invention. Suffice it to say, in the embodiment of the invention illustrated the feeding operation takes place in the lower rear station.

Figure 8:
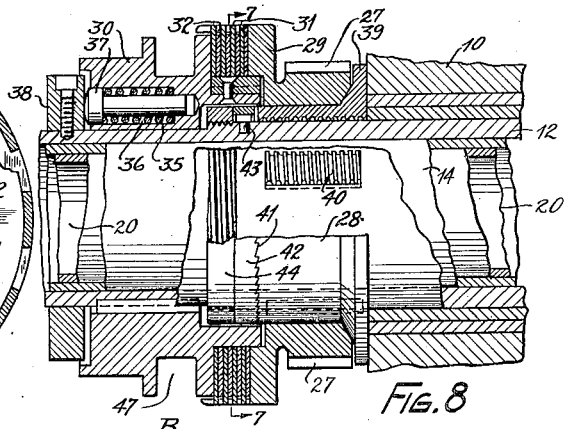
Fig. 8 is a section on the line 8—8 of Fig. 7, with portions shown in elevation.
Figure 4:
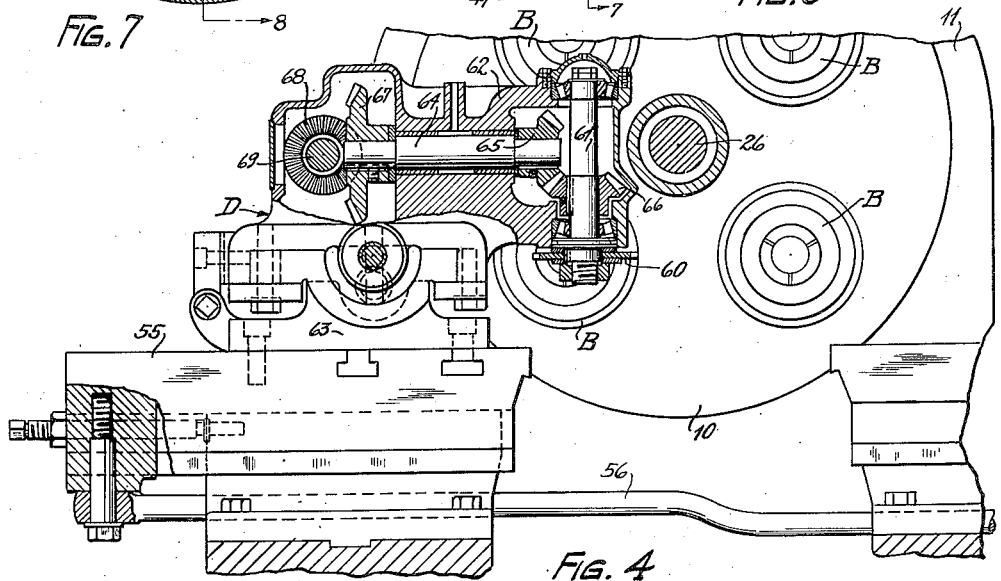
Fig. 4 is a transverse section through the machine approximately on the line 4—4 of Fig. 3.
Figure 6:
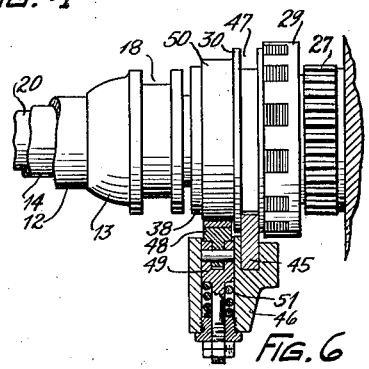
Fig. 6 is a section approximately on the line 6—6 of Fig. 5.

The spindles B are all driven from a centrally positioned driving gear 25, fixed to a main drive shaft 26 extending longitudinally of the machine, through the medium of gears 27 rotatably supported on bronze members 28 carried by the spindle tubes 12 and continuously in mesh with the driving gear 25. The gears 27 are provided with enlarged hubs 29 which comprise the driving element of the friction clutch previously referred to and designated in general by the reference character C, the driven element 30 of which is slidably keyed to the spindle tube 12. The friction clutch C comprises interposed driving and driven disks 31 and 32, respectively, slidably keyed to the driving element 29 and the driven element 30, respectively. The driven element 30 is continuously urged toward the right, as viewed in Figs. 2, 6, and 8, to engage the clutch by a plurality of compression springs 35 positioned in apertures 36 opening into the rear thereof. Headed members 37 slidably supported in the apertures close the ends thereof and abut a collar member 38 fixed to the spindle tube 12. Movement of the driving members 29 toward the right, as viewed in Fig. 8, is prevented by an annular flange 39 on the members 28.

To permit adjustment of the spindles B, the members 28 are threaded on a plurality of keys 40 positioned in suitable grooves formed in the spindle tubes 12. The members 28 are held in any adjusted position by cooperating 90° ratchet teeth 41 formed on adjacent ends thereof and an annular collar 42 slidably keyed to the spindle tube 12 by means of square headed members 43 fixed to the spindle tubes. After the spindles have been adjusted as desired, the parts are held in their adjusted positions by a lock or jam-nut 44 threaded on the spindle tube 12. The ratchet teeth 41 positively prevent any rotation of the member 28 relative to the spindle tube 12 during operation.

Figure 5:
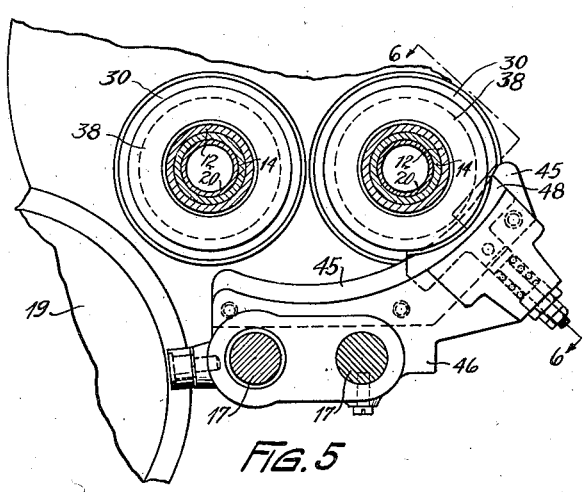
Fig. 5 is a section on the line 5—5 of Fig. 2.

The driven elements 30 of the clutches C are operated in predetermined timed relation to the other operations of the machine, to release the clutches and to disengage the spindles B from their driving means in the lower front station as the same are successively indexed therethrough. As the spindles B index into this station, a brass shoe 45 carried by a member 46 slidably supported on one of the rods 17 and fixed to the other thereof which is in turn slidably supported in the frame A engages in an annular groove 47 formed in the exterior of the driven members 30. The member 46 is actuated by and under the control of the cam drum 19, and after the shoe 45 has engaged within the annular groove 47, the member is moved toward the left as viewed in Figs. 2 and 6 to release the clutch plates 31, 32. Preferably the shoe 45 is elongated in such a manner that it engages within the groove 47 shortly after the indexing operation commences, see Fig. 5, and the movement of the member 46 is so timed that the clutch C is disengaged before the indexing operation has been completed.

As the spindle moves into the lower front station, a brake shoe 48 pivotally connected with a spring-pressed member 49 slidably supported in the member 46 engages a smooth outside surface 50 on the driven element 30. The brake shoe 48, under the action of the spring 51, quickly brings the spindle to rest and holds the same in a fixed position until the slotting operation hereinafter referred to is completed and the tool withdrawn, after which the member 46 is returned to permit the clutch C to connect the spindle with its drive, and the turret indexed to bring the next succeeding spindle into the station.

As has been previously stated, in the embodiment of the invention illustrated, a slotting operation is performed upon the work in the lower front station. The slotting mechanism proper, designated in general by the reference character D, and which may be built as an integral part of the machine if desired, is illustrated as an attachment bolted or otherwise secured to the front cross-slide 55. The cross-slide 55 is of conventional construction and is moved transversely of the axis of the spindle by mechanism well known in the art, which, as illustrated, comprises an adjustable link 56 pivotally connected at one end to the cross-slide 55 and at the other end to one arm of a bell-crank lever 57 pivotally supported by a horn on the rear of the frame A. The bell-crank lever 57 is actuated by and is under the control of a cam drum 58 fixed to the main cam shaft 59 of the machine. The slotting mechanism D comprises a milling cutter 60 detachably secured to the lower end of a cutter shaft 61 rotatably supported by means of anti-friction bearings in an auxiliary slide 62 slidably supported on a base member 63 which in turn is bolted to the top of the front cross-slide 55. The tool shaft 61 is driven from a stud shaft 64 rotatably supported in the auxiliary slide 62 through the medium of miter gears 65 and 66. The stud shaft 64 is driven through the medium of a bevel gear 67 continuously in mesh with a bevel gear 68 keyed to a longitudinal shaft 69.

The shaft 69, which is rotatably supported in the auxiliary slide 62 and provided with anti-friction thrust bearings for the purpose of taking up end thrust, is driven from and operatively connected to one end of a drive shaft 70 through the medium of a universal joint 71. The other end of the shaft 69 is operatively connected through the medium of a universal joint 72 to one end of a shaft 73 slidably keyed in a tubular shaft 74 rotatably supported in a housing 75 secured to the frame A in any conventional manner. The shaft 73 is driven from the main drive shaft 26 of the machine through the medium of a flexible drive connection in the form of a link chain 76 surrounding a driven sprocket 77 keyed to the shaft 26 and a driven sprocket 78 fixed to the tubular shaft 74. The shaft 69 is enclosed in a telescopic guard tube 79 opposite ends of which are supported for universal movement on the auxiliary slide 62 and the housing 75 through the medium of brackets 80 and 81, respectively.

The auxiliary slide 62 is continuously urged toward the right as viewed in Figs. 2 and 3 by a compression spring 86 positioned in an aperture 87 in the member 63. One end of the spring 86 abuts a plug 88 threaded into the left hand end of the aperture and the other end a plug 89 on a pin 90 secured to the auxiliary slide 62 and projecting through a slot 91. The auxiliary slide 62 is moved toward the left, as viewed in Figs. 2 and 3 by the main tool slide 93 through the medium of a bar 94 bolted to the front face of the tool slide and provided with an aperture 95 through which a rod 96 secured to a boss 97 on the auxiliary slide 62 projects. Movement of the bar 94 relative to the rod 96 is limited by adjustable stops 98 and 99 threaded on the rod 95, and held in any adjusted position by the nuts 100 and 101 respectively. The construction just referred to provides a lost motion connection between the main tool slide 93 and the auxiliary slide 62 of the slotting attachment D, whereby the amount of movement imparted to the slotting tool 60 may be controlled and adjusted. The slot 95 is elongated so as to provide for the transverse movement of the cross tool slide 55. Movement of the auxiliary tool slide 62 under the action of the spring 90 is further limited by the engagement of an adjustable stop screw 105, threaded into an aperture formed in a projecting lug 106 on the member 63, with a lug 107 on the auxiliary slide 62. A positive stop for the auxiliary slide 62 in the other direction is provided in the form of an adjustable stop screw 108 threaded into an aperture formed in a projecting lug 109 similar to the lug 106, and adapted to engage the opposite side of the projecting lug 107. Both screws 105 and 108 are provided with lock nuts to retain the same in adjusted position.

The cutter 60 is continuously rotated with the main driveshaft 26 and may be moved transversely and/or longitudinally of the spindle, or any desired combination of these movements may be imparted thereto depending upon the shape of the cam plates which control the main and cross tool slides. For example, if it is desired to cut a transverse slot in the end of a blank, the tool can be moved to the desired depth by the main tool slide 93 and thereafter fed across the end of the blank by movement of the cross-slide 55. If it is desired to cut a longitudinal slot in the blank, the tool can first be fed into depth by movement of the cross-slide 55 and then longitudinally of the spindle by the main tool slide 93. While, in the preferred embodiment of the machine illustrated, the movement of the auxiliary tool slide 62 longitudinally of the spindle is produced by the spring 90 and the main tool slide 93, it will be apparent that other means may be provided for producing this movement of the tool slide.

From the foregoing description of the preferred embodiment of the invention, it will be apparent that the objects of the invention have been attained and that a new and improved metal working machine of the character referred to has been produced. While the invention has been illustrated and described with reference to the preferred embodiment thereof, the same is not limited to the particular construction illustrated and described, which construction may be varied within the scope thereof. The invention relates to certain novel features and details of construction, and combinations and arrangements of parts. This application is intended to cover all variations, adaptations, and uses thereof that come within the knowledge and customary practice of those skilled in the art to which it pertains, and I particularly point out and claim as my invention the following:

1. In a machine of the character described, the combination of a rotatable work carrying spindle, means for rotating said spindle, automatic means for periodically disconnecting the first mentioned means from said spindle and holding the same stationary for a predetermined interval of time, a tool slide movable longitudinally of the axis about which said spindle rotates, a tool spindle rotatably supported by said tool slide and adapted to support a milling cutter, and automatic means for moving said slide in predetermined timed relation to the actuation of the second mentioned means.

2. In a machine of the character described, the combination of an indexable spindle turret, a plurality of rotatable work carrying spindles supported in said turret, means for intermittently rotating said turret whereby said spindles are indexed through a plurality of tool stations, means for rotating said spindles, automatic means for disconnecting the second mentioned means and holding the spindles stationary in one of the stations, a tool slide at said station movable longitudinally of the axis about which said spindles rotate, a tool spindle rotatably supported by said tool slide and adapted to support a milling cutter, and automatic means for moving said tool slide in predetermined timed relation to the indexing of the said turret.

3. In a machine of the character described, the combination of a rotatable work carrying spindle, means for rotating said spindle, automatic means for disconnecting the first mentioned means from said spindle and holding the same stationary, a tool slide movable transversely of the axis about which said spindle rotates, a tool spindle rotatably supported by said tool slide and adapted to carry a milling cutter, means for rotating said tool spindle, and automatic means for moving said tool slide in predetermined timed relation to the actuation of the second mentioned means.

4. In a machine of the character described, the combination of a rotatable work carrying spindle, means for rotating said spindle, automatic means for periodically disconnecting the first mentioned means from said spindle and holding the same stationary for a predetermined interval of time, a tool slide movable both transversely and longitudinally of the axis about which said spindle rotates, a tool spindle rotatably supported by said tool slide and adapted to support a milling cutter, means for rotating said tool spindle, and automatic means for moving said slide in both directions in predetermined timed relation to the actuation of the second mentioned means.

5. In a machine of the character described, the combination of an indexable spindle turret, a plurality of rotatable work carrying spindles supported in said turret, means for intermittently rotating said turret whereby said spindles are indexed through a plurality of tool stations, means for rotating said spindles, automatic means for disconnecting the second mentioned means and holding the spindles stationary in one of the stations, a tool slide at said station movable transversely of the axis about which said spindles rotate, a tool spindle rotatably supported by said tool slide and adapted to support a milling cutter, means for rotating said tool spindle, and automatic means for moving said tool slide in predetermined timed relation to the indexing of the said turret.

6. In a machine of the character described, the combination of an indexable spindle turret, a plurality of rotatable work carrying spindles supported in said turret, means for intermittently rotating said turret whereby said spindles are indexed through a plurality of tool stations, means for rotating said spindles, automatic means for disconnecting the second mentioned means and holding the spindles stationary in one of the stations, a tool slide at said station movable both transversely and longitudinally of the axis about which said spindles rotate, a tool spindle rotatably supported by said tool slide and adapted to support a milling cutter, means for rotating said tool spindle, and automatic means for moving said tool slide in both directions in predetermined timed relation to the indexing of said turret.

7. In a machine of the character described, the combination of an indexable spindle turret, a plurality of rotatable work carrying spindles supported on said turret, means for intermittently rotating said turret whereby said spindles are indexed through a plurality of tool stations, means for rotating said spindles, automatic means for disconnecting the second mentioned means and holding the spindles stationary in one of the stations, a tool slide assembly at said station comprising a main slide, an auxiliary slide carried by the main slide, one of said slides being movable transversely of the axis about which the spindles rotate and the other said slides being movable longitudinally thereof, a tool spindle rotatably supported by said auxiliary tool slide and adapted to support a milling cutter with its axis of rotation normal to the plane of movement of said slides, means for rotating said tool spindle, and automatic means for moving both of said slides in predetermined timed relation to the indexing of said turret.

8. A slotting attachment for a metal working machine including a rotatable work carrying spindle and a cross-slide movable transversely of the axis of rotation thereof, comprising a base adapted to be detachably secured to the cross-slide of the machine, a tool slide movably supported on said base, a tool spindle rotatably supported by said tool slide and adapted to carry a milling cutter, means for rotating said tool spindle, and means for moving said tool slide adapted to be operatively connected to the machine.

9. A slotting attachment for a metal working machine including a rotatable work carrying spindle and a cross-slide member transversely of the axis of rotation thereof, comprising a base adapted to be detachably secured to the cross-slide of the machine, a tool slide slidably supported on said base, an adjustable stop for limiting the movement of said tool slide relative to said base, a tool spindle rotatably supported by said tool slide and adapted to support a milling cutter with its axis of rotation normal to the plane of movement of said tool slide, a driven shaft rotatably supported by said slide adapted to be operatively connected to the machine drive, means for operatively connecting said tool spindle and said driven shaft, and means for moving said tool slide adapted to be operatively connected to the machine.

HARRY W. RUPPLE.